United States Patent [19]
Sun

[11] Patent Number: 6,014,181
[45] Date of Patent: Jan. 11, 2000

[54] ADAPTIVE STEP-SIZE MOTION ESTIMATION BASED ON STATISTICAL SUM OF ABSOLUTE DIFFERENCES

[75] Inventor: Kai Sun, Laguna Nigel, Calif.

[73] Assignees: Sharp Laboratories of America, Inc., Camas, Wash.; Sharp Kabushiki Kaisha, Osaka, Japan

[21] Appl. No.: 08/949,303

[22] Filed: Oct. 13, 1997

[51] Int. Cl.$^7$ .................................................. H04N 7/50
[52] U.S. Cl. .......................................... 348/699; 348/416
[58] Field of Search .................................. 348/699–700, 348/416, 402, 407, 413, 397–398, 408, 420, 384, 390; 386/111, 109, 112, 33, 27; 382/236, 238–239, 240, 244, 250; H04N 7/50

[56] References Cited

U.S. PATENT DOCUMENTS

| | | | |
|---|---|---|---|
| 5,151,784 | 9/1992 | Lavagetto et al. | 348/416 |
| 5,173,772 | 12/1992 | Choi | 348/416 |
| 5,537,155 | 7/1996 | O'Connell et al. | 348/699 |
| 5,604,546 | 2/1997 | Iwata | 348/699 |
| 5,793,429 | 8/1998 | Kim et al. | 348/416 |

OTHER PUBLICATIONS

Candotti et al, "Pyramidal Multiresolution Source Coding for Progressive Sequences", IEEE, pp. 789–795, Jun. 1996.
Song et al, "A Hierarchical Motion Estimation Algorithm Using Nonlinear Pyramid for MPEG–2", IEEE International Symp. on Cir. and Sys., pp. 1165–1168, Jun. 1997
Article Entitled, "Efficient Motion Vector Estimation and Coding for H.263–Based Very Low Bit Rate Video Compression", by Guy Cote, Michael Gallant and Faouzi Kossentini, presented in ITU–Telecommunications Standardization Section, Document Q15–A–45, Study Group 16, Filename: q15a45.ps, presented Jun. 24–27, 1997, pp. 1–8.
Article Entitled, "Adaptive Block Matching Motion Estimation Algorithm Using Bit–Plan Matching", by J. Feng, K.–T. Lo, H. Mehrpour & A.E. Karbowiak, presented 1995 IEEE, pp. 496–499.
Article Entitled, "Novel Fast Block Motion Estimation in Feature Subspace", by Y–H. Fok, O.C. Au and R.D. Murch, presented 1995 IEEE, pp. 209–212.
Article Entitled, "An Efficient Heuristic–Based Motion Estimation Algorithm", by Yiwan Wong, presented 1995 IEEE, pp. 205–208.
Article Entitled, "Motion Compensation of Motion Vectors", by J. Yeh, M. Vetterli and M. Khansari, presented 1995 IEEE, pp. 574–577.
Article Entitled, "Adaptive Overlapping Approach for DCT––Based Motion Estimation", by Ut–Va Koc and K.J. Ray Liu, presented 1995 IEEE, pp. 223–226.
Article entitled, "A New Two–Stage Global/Local Motion Estimation Based on a Background/Foreground Segmentation ", by F. Moscheni, F. Dugaux and M. Kunt, presented 1995 IEEE, pp. 2261–2264.
Draft H. 263 dated Mar. 10, 1997, ITU–T Telecommunication Standardization Sector of ITU, Line Transmission of Non–Telephone Signals, Vido Code for Low Bitrate Communication, contact person, Gary J. Sullivan, pp. 1–87.

*Primary Examiner*—Vu Le
*Attorney, Agent, or Firm*—Gerald Maliszewski; David C. Ripma

[57] ABSTRACT

A novel motion estimation algorithm, AMESSAD (adaptive motion estimation based on statistical sum of absolute difference) is provided. The algorithm adaptively determines motion search step size based on statistical distribution of SAD (sum of absolute difference). That is, search step sizes to estimate motion in one portion of a frame are calculated using SAD values from neighboring portions of the frame. The efficient search procedure improves the implementation of motion compensation and transform based hybrid video coders, such as the H.26P and MPEG-X standard video compression. Compared with fixed step-size motion estimation, the adaptive algorithm improves motion estimation and hence overall video encoding speed. In addition, improved visual quality can be achieved in many cases because the algorithm differentiates regions with motion activity and allocates more motion estimation resources to local areas or local frames with higher motion content.

33 Claims, 10 Drawing Sheets

FLOW CHART
FIXED STEP SEARCH
FOR A MACROBLOCK

ADAPTIVE STEP-SIZE MOTION ESTIMATION BASED ON STATISTICAL SUM OF ABSOLUTE DIFFERENCES

BACKGROUND AND SUMMARY OF THE INVENTION

This invention relates generally to motion estimation in video imaging systems and, more particularly, to a method of reducing the search time required to estimate a change in position between images in consecutive video frames.

A video information format provides visual information suitable to activate a television screen, or store on a video tape. Generally, video data is organized in a hierarchical order. A video sequence is divided into group of frames, and each group can be composed of a series of single frames. Each frame is roughly equivalent to a still picture, with the still pictures being updated often enough to simulate a presentation of continuous motion. A frame is further divided into slices, or horizontal sections which helps system design of error resilience. Each slice is coded independently so that errors do not propagate across slices. A slice consists of macroblocks. In H.26P and MPEG-X standards, a macroblock is made up of 16×16 luma pixels and a corresponding set of chroma pixels, depending on the video format. A macroblock always has an integer number of blocks, with the 8×8 pixel matrix being the smallest coding unit.

Video compression is a critical component for any application which requires transmission or storage of video data. Compression techniques compensate for motion by reusing stored information in previous frames (temporal redundancy). Compression also occurs by transforming data in the spatial domain to the frequency domain. Hybrid digital video compression, exploiting temporal redundancy by motion compensation and spatial redundancy by transformation, such as Discrete Cosine Transform (DCT), has been adapted in H.26P and MPEG-X international standards as the basis. FIG. 1 is a block diagram for a video encoding system (prior art).

Motion estimation is critical in such video compression systems to reduce the flow of transmitted data. Motion estimation is performed over two frames, the current frame to be encoded and the previous coded frame, also called reference frame, to derive video data matching between the two frames. In practice, video compression, including motion estimation, is carried out macroblock wise, to facilitate hardware and software implementations. Motion estimation is performed for each macroblock using a 16×16 matrix of luma pixels. Then, the motion estimation results are applied to all the blocks in the macroblock. For a macroblock in the current frame, the best matching area in the last frame is used as the prediction data for the current macroblock, while the prediction error, the residue after subtracting the prediction from the macroblock data, is removed of temporal data redundancy. Temporal redundancy refers to the part of the current frame data that can be predicted from the previous frame. The removal of redundancy, or subtracting prediction values, eliminates the need to encode the repeated part of the data.

After temporal redundancy removal, video compression is further achieved by removing the correlation among neighboring prediction error pixels. This is to eliminate spatial redundancy inherent in video data. This is accomplished by Discrete Cosine Transform(DCT), to obtain compact representation in the frequency domain, and subsequent quantization of transformed coefficients to preserve only significant coefficients. DCT and quantization are performed for each 8×8 block independently.

The goal of motion estimation, for each macroblock, is to find a 16×16 data area in the previous frame which best represents the current macroblock. There are a variety of motion estimation criteria for the data matching. Ultimately, a criteria which links video source coding to generate the smallest bitstream achieves best compression performance. In practice, motion estimation is a process separated from the source coding of quantized coefficients. That is, motion estimation is performed without checking the final bitstream size, avoiding awkward computational complexity. Furthermore, only luma data is used for motion estimation within each macroblock, and applied to both luma and chroma coding. Handling just luma pixels simplifies procedures, and the human visual system has a higher sensitivity to luminance changes over color changes. Though motion estimation criteria has been investigated in different domains, even in frequency domain, an effective and widely adapted criteria is the sum of absolute difference (SAD). SAD has been found to provide an accurate representation to relate motion estimation with coding efficiency. It is computationally straight forward and much faster than, for example, minimum mean square error measure.

For the macroblock at (x, y) position, the SAD between the current macroblock and a 16×16 block in the previous frame offset by (vx, vy) is $$SAD(vx, vy) = \sum_{j=0}^{15} \sum_{i=0}^{15} |p(x+i, y+j) - q(x+i+vx, y+j+vy)|$$

where, p(x+i, y+j) is a pixel value in the current macroblock of the current frame, q(x+i+vx, y+j+vy) is a pixel value in the previous frame, in a 16×16 block offset by (vx, vy) from the current macroblock. The summation indices i and j cover the area of the macroblock. If SAD(vx, vy) is the minimum in the pre-specified search range, then (vx, vy) is the motion vector for the macroblock.

The motion estimation search range (M, N) is the maximum of (vx, vy), defining a window of data in the previous frame containing macroblock-sized matrices to be compared with the current macroblock. To be accurate, the search window must be large enough to represent motion. On the other hand, the search range must be limited for practical purpose due to high complexity involved in the computation of motion estimation. FIG. 2 is a drawing illustrating the spatial relationship between the current macroblock in the current frame and search window in the previous frame (prior art). If motion vector range is defined to be (M, N), then the search window size is (16+2M, 16+2N). For TV or movie sequences, the motion vector range needs to be large enough to accommodate various types of motion content. For video conferencing and videophone applications, the search range can be smaller. Therefore, the choice of search range is a combination of application and availability of deliverable technology.

Given a motion estimation search range, the computational requirement is greatly affected by the exact method of covering the search window to obtain motion vectors. An exhaustive search technique, full motion estimation search, covers all the candidate blocks in the search window to find the best match. In this case, it requires (2M+1)×(2N+1) calculations of the cost function to obtain motion vector for each macroblock. This computation cost is prohibitive for software implementations.

Different schemes have been used to reduce the computation cost, such as telescopic search and step search. The fixed-step search method has a good balance of effectiveness and complexity, and has been widely used in estimating motions. FIG. 3 is a flow chart illustrating the fixed-step motion estimation method (prior art).

The fixed-step motion estimation method uses a fixed number of steps inside a search window to find the best match, with a smaller scale search window for each next step. The method starts with 9 points uniformly distributed in the valid area of target search window in the previous frame. Each of the 9 points represents the upper-left corner of the macroblock-sized area, or matrix of luma pixels. The matrix with the minimum SAD in the current step is used as the starting point (new center of search grid) for the next step. The next step is performed in the same way, with half the distance between search points, or matrices. If the space between search points in the last step is w, then it is w/2 for the current step. This procedure is continued until the last step, in which all the 9 search points are adjacent and no more zooming-in is possible for integer pixels. FIG. 4 is an example illustrating the last 3 steps in the step search method of FIG. 3 (prior art). The example covers motion vector range of (−7, +7) in both horizontal and vertical directions. If the motion vector range is (−15, +15), then 4 steps are needed.

For a motion vector range of (−15, +15), the number of cost function calculations is (9+8+8+8)=33. That is, 9 SAD calculations are made in the first step. Since the matrix with the lowest SAD is included (as the center) of the second search step, only 8 SAD calculations are needed. Likewise, only 8 SAD calculations are needed in steps 3 and 4. Compared to the number of calculations required to check the SAD of every matrix in the 16×16 pixel search window (full search), the number of calculations required in the fixed-step method is small. It takes (2*15+1) * (2*15+1)= 961 cost function calculations in a full search. Comparing with full search, the computation is dramatically reduced to 3.4%.

However, the fixed-step method is not responsive to the accuracy of the initial starting matrix in the previous frame, or the accuracy the motions estimates made for neighboring macroblocks. For example, if there is no motion in a macroblock between the previous frame and the current frame, then the starting matrix in the search is likely to have the lowest SAD. Is this situation, it is wasteful to perform all 33 computations, as described above. On the other hand, when there is a great deal of motion between frames, the fixed-step estimation method as described above, may be unable to find the matrix with the best SAD despite making 33 computations. For example, the matrix with the best SAD may be outside the initial search area defined by an 32×32 matrix. In this situation it would be better if the original search area was defined by a 48×48 matrix. Permanently setting the initial fixed-step search window to accommodate a 48×48 matrix is possible, however, then every estimation would require 5 steps, or 41 computations (9+8+8+8+8), which is wasteful in the average, low change, motion scenario.

It would be advantageous if a method was available to reduce the search window size, reducing the number of computations needed, for use with the fixed-step method of motion estimation when there is only a slight motion in the image represented in 2 successive video frames.

It would be advantageous if a method was available to increase the window size for use with fixed-step motion estimation when there is dramatic motion in the image represented in 2 successive frames.

It would be advantageous if a method was available for use with the fixed-step method of motion estimation that adjusted the search window size in response to the average change in position, as calculated from the estimation of motion in neighboring macroblocks.

Accordingly, a method for efficiently estimating the change in position of an image represented by a matrix of luma pixel data in a series of blocks in the current frame, from corresponding block-sized matrices of luma pixel data in the previous frame, is provided. The method applies to a digital video system compression format where a video sequence is represented in series of frames, including a previous frame followed by a current frame, all separated by a predetermined time interval. The frames are divided into a plurality of blocks with predetermined positions, with each block having a size to include a predetermined matrix of luma pixels. The method comprising the steps of:

a) selecting a first block in the current frame;

b) selecting a block-sized matrix of luma pixels in the previous frame as an initial candidate matrix corresponding to the first block in the current frame;

c) providing a short term average comparison of luma pixel data between frames, derived from previous block position change estimates;

d) calculating a search window size, centered about the candidate matrix, in response to a short term average comparison of luma pixel data presented in Step c); and e) comparing the luma pixel data from a plurality of block-sized matrices of luma pixels uniformly distributed inside the search window, to the luma pixel data of the first block in the current frame, to select a new candidate matrix having luma pixel data most similar to the luma pixel data of the first block in the current frame, whereby the size of the search window varies with the history of motion between frames.

Addition steps are included, following Step e), of:

f) reducing the spacing between the plurality of block-sized matrices located inside the search window after each iteration of Step e);

g) repeating Steps e)–f) until the spacing between the plurality of block-sized matrices matches the size of a user-defined minimum spacing, to select a final candidate matrix in the final iteration of Step e); and h) comparing luma pixel data of the final candidate matrix selected in the final iteration of Step e) to the luma pixel data of the first block in the current frame, to calculate a final comparison of luma pixel data, whereby the difference in block position between the final candidate matrix and the first block provides a vector describing motion between frames.

After the final candidate matrix is found, the short term average comparison is updated with the final comparison of luma pixel data calculated in Step h). The search window size is also calculated with the use of a long term average of search window sizes. The long term search window size is updated in response to the calculation of a new short term average comparison of luma pixel data. The long term average search window size is also calculated with a long term average comparison of luma pixel data, which is updated after Step h).

Typically, the luma pixel data is compared through a calculation of the sum of absolute differences (SAD) of luma pixel data. In Step e), the block-sized matrix with the smallest SAD is selected as the candidate matrix in the next iteration of Steps e)–f), and Step h) includes a calculation of the minimum SAD (SAD_min) as the final comparison of luma pixel data. Further, SAD information is used to create both the short term (SAD_ave), and long term average (SAD_aveLT) comparisons of luma pixel data. The total number of macroblocks in a frame are also used to calculate SAD_ave, and the total of macroblocks from several frames is used to calculate SAD_aveLT.

The method includes defining the search window size in terms of the number of iterations (ME_step) of Steps e)–f) required until the spacing between block-sized matrices is the minimum spacing. Then, Step e) includes initially distributing the plurality of block-sized matrices compared in the search window in response to the value of ME_step, and Step f) includes halving the search window size every iteration.

DETAILED DESCRIPTION OF THE PREFERRED EMBODIMENT

Hybrid video codec uses motion compensation to eliminate or reduce video data temporal redundancy in consecutive frames. Representing the physical world, motion flow in a video sequence is generally smooth. That is, the first order derivative in video data is highly correlated in temporal direction. This is especially true in high frame-rate video sequences, in which any motion activity covers a number of frames.

The adaptive motion estimation based on statistical sum of absolute differences (AMESSAD) algorithm, described below, improves fixed-step motion estimation by making use of the motion vector continuity property to dynamically and efficiently assign motion estimation characteristics to each macroblock. The algorithm is also based on the presumption that objects with fast motion have faster changes in motion speed, and objects with slow motion have slower changes in motion speed. That is, regions with motion tend to have high second derivative in video data. Locally (within a frame), longer motion estimation steps are assigned to macroblocks with rich motion content. Shorter motion estimation steps are assigned to static background type of macroblocks. In long term processing (over several frames), a segment of frames with heavy motion has longer average motion estimation steps. While a segment of frames with light motion has short average steps for motion estimation, based on the statistical analysis by the algorithm of the present invention.

The use of AMESSAD results in improved motion estimation speed, compared with fixed-step motion estimation. In many cases, the application of algorithm also results in better video visual quality.

Figure 5:
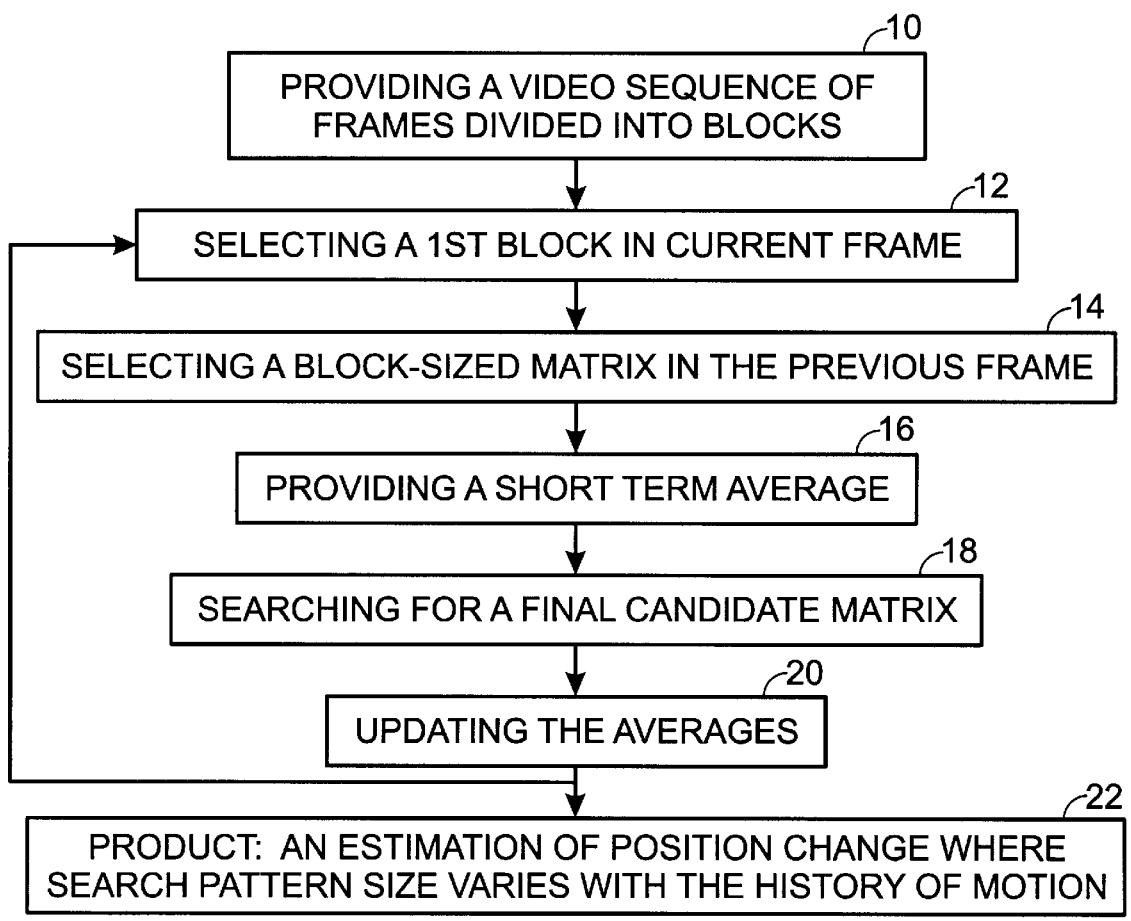
FIG. 5 is a flow chart illustrating the method for efficiently estimating the change in position of an image represented by matrix of luma pixel data in a series of blocks in the current frame, from corresponding block-sized matrices of luma pixel data in the previous frame.

FIG. 5 is a flow chart illustrating the method for efficiently estimating the change in position of an image represented by a matrix of luma pixel data in a series of blocks in the current frame, from corresponding block-sized matrices of luma pixel data in the previous frame. Step 10 provides a digital video system having a compression format where a video sequence is represented in series of frames. Specifically, the series of frames include a previous frame followed by a current frame. All the frames are separated by a predetermined time interval. The frames are divided into a plurality of blocks with predetermined positions, with each block having a size to include a predetermined matrix of luma pixels. For example, block 1 has a fixed position, including the same matrix of pixels in each successive frame. Typically, the blocks of luma pixels are macroblocks, each containing a 16×16 matrix of luma pixels, although the present method is applicable to pixel blocks of any size. Various statistical parameters, described in detail below, are initialized to zero at the beginning on the application program, and then updated after the motion estimation calculated for each macroblock.

Step 12 selects a first block in the current frame, or the next macroblock in the series of macroblocks in the current frame. Typically, each block is identified with an address so that neighboring blocks have consecutive addresses. The present method works better when the serial order of macroblocks to be estimated moves from the upper-left to the lower-right of the frame, but the method is also applicable to other means of ordering and selecting each block for estimation.

Step 14 selects a block-sized matrix of luma pixels in the previous frame as an initial candidate matrix corresponding to the first block in the current frame. In the preferred embodiment, Step 14 includes selecting the initial candidate matrix in response to position changes previously estimated for neighboring blocks. In this manner, an intra prediction is used to start the estimation process for the first block. The block immediately to the left, and above, the first block is typically used.

In some aspects of the invention Step 14 includes selecting the initial candidate matrix in response to a position change previously estimated for the first block in the previous frame, whereby an inter prediction is used to start the estimation process for the first block.

Step 16 provides a short term average comparison of luma pixel data between frames, derived from previous block position change estimates. Step 16 is the heart of the present invention. It is the inclusion of Step 16 in the process of determining the search window size, described below, that gives the present method the flexibility of expanding the search window when there is dramatic motion between frames, and reducing the search window size when there is little motion between frames. As is discussed in more detail below, the short term average of Step 16 is a calculated value, highly dependent on the luma pixel comparisons of neighboring macroblocks, especially the macroblock position change estimate made immediately prior to the selection of the first block in Step 12.

Step 18, with the use of the short term average provided in Step 16 to define the search pattern, includes searching in the area of luma pixels surrounding the candidate matrix to find a final candidate block-sized matrix that most closely compares with the luma pixel data of the first block, whereby a history of position changes defines the search pattern.

Step 20, following Step 18, includes updating the averaging statistics. Specifically, Step 20 includes a first Sub-step (not shown) of updating the short term average comparison of luma pixel data, with the comparison of luma pixel data of the first block and the final candidate matrix calculated in Step 18, whereby the short term average is modified for provision in Step 16 of the next block position change estimate. A second Sub-step (not shown), following Step 18, includes modifying, or updating a long term average comparison of luma pixel data with the comparison of luma pixel data of the first block and the final candidate matrix calculated in Step 18.

A third Sub-step (not shown) of Step 20, following the second Sub-step, updates a long term average of search pattern sizes in response to the short term average comparison of luma pixel data updated in the first Sub-step and the long term average comparison of luma pixel data updated in the second Sub-step. In a preferred embodiment, an additional step 16a (not shown) following Step 16, and proceeding Step 18, provides the long term average of search pattern size calculated in the previous block position change estimate, and Step 18 includes defining the search pattern in response to the long term average search pattern size. In the special circumstance of estimating the macroblock after initialization, the values used in the first, second , and third Sub-steps of Step 20 are zero, or a user-defined value.

Following Step 20, the method depicted in FIG. 5 forks to either Step 12, or to Step 22. The process returns to Step 12 to repeat the position change estimate process for the next macroblock in series, subsequent to the first block just estimated in Step 12. The process continues to iterate from Step 12 to Step 20 to estimate the motion of substantially every macroblock in substantially every video frame. Step 22 represents the end of the method. The resulting product is the estimation of macroblock position changes where the search pattern size, or the number of search iterations varies with the history of motions between frames, or the history of SAD between previously estimated macroblocks.

Step 18 includes comparing luma pixel data by the calculation of the sum of absolute differences (SAD) of luma pixel data between each of the plurality of block-sized matrices in the search window, and the first block in the current frame. Therefore, the calculation of the block-sized matrix with the minimum SAD (SAD_min) is the comparison of luma pixel data between the first block and the final candidate matrix.

Step 16 includes a short term average of SAD (SAD_ave) as the short term average comparison of luma pixel data. Then, the first Sub-step of Step 20 includes updating SAD_ ave with the SAD_min calculated in Step 18. In this manner, the SAD_ave is updated with SAD values in the first Sub-step of Step 20 for provision in Step 20 of the next block position change estimate.

The second Sub-step of Step 20 includes a long term average (SAD_aveLT) as the long term average comparison of luma pixel data. That is, the second Sub-step includes updating SAD_aveLT with SAD_min calculated in Step 18. In this manner, SAD_aveLT is updated with SAD values in the second Sub-step of Step 20 for provision in the third Sub-step.

The first Sub-step of Step 20 includes updating SAD_ave in response to the total number of blocks in a frame. For example, the total number of blocks in the current frame. In some aspects of the invention, a frame contains 99 blocks. Likewise, the second Sub-step of Step 20 includes updating SAD_aveLT in response to the total number of blocks in a plurality of frames. In some aspects of the invention the number of macroblocks in 3 frames is used (3×99).

In a preferred embodiment of the invention, A fourth Sub-step of Step 20 (not shown), following the first Sub-step of Step 20 calculates a variance in SAD (SAD_var) in response to SAD_min calculated in Step 18, SAD_ave updated in the first Sub-step of Step 20, and a the number of macroblocks in a frame. When SAD_var is used, Step 16b (not shown), following Step 16, and proceeding Step 18, provides SAD_var, and Step 20 includes defining the search pattern in response to the SAD_var. Detailed definitions of SAD_ave, SAD_aveLT, and SAD_var are provided below.

Figure 6A:
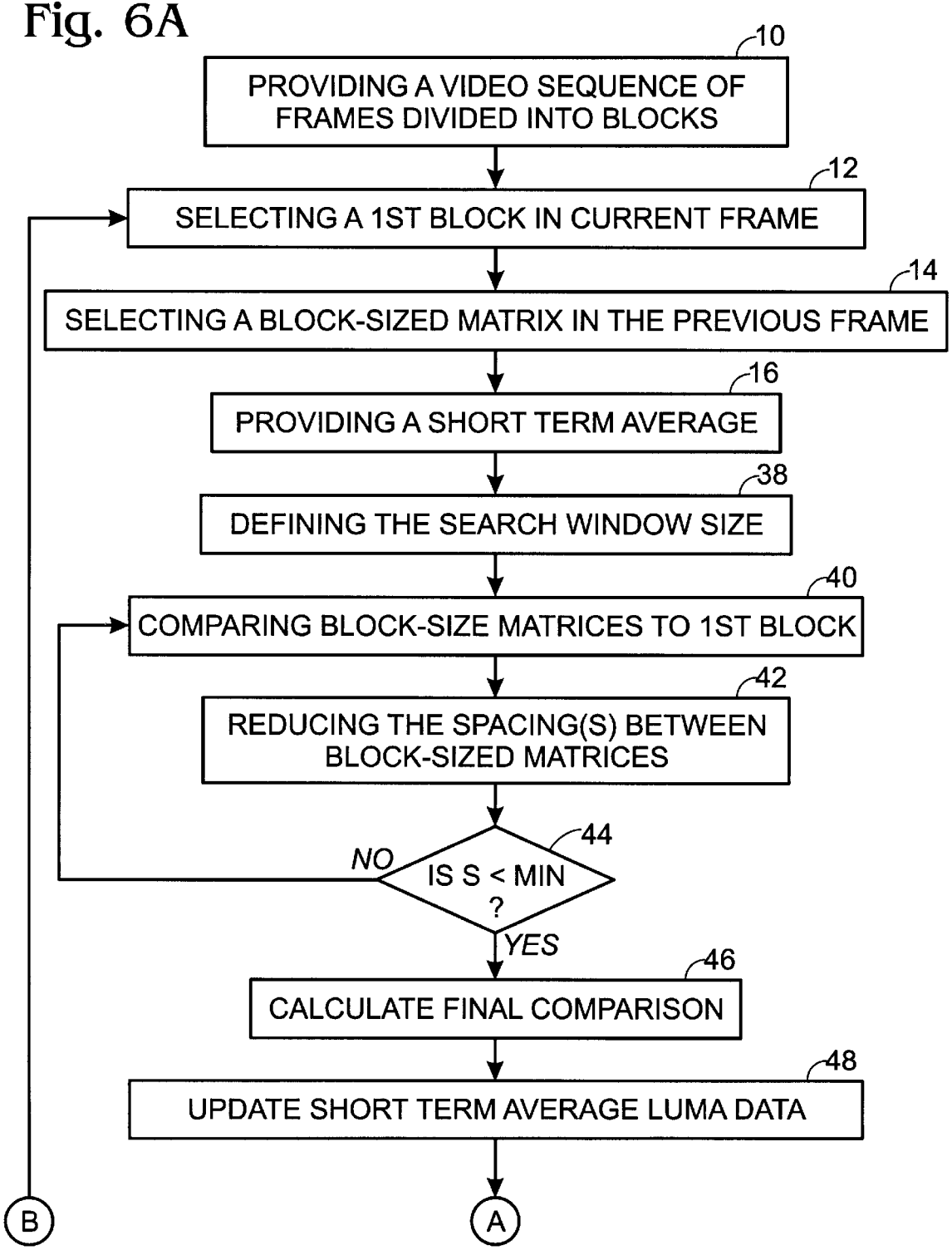
FIG. 6 is a more detailed depiction of the flow chart of FIG. 5.
Figure 6B:
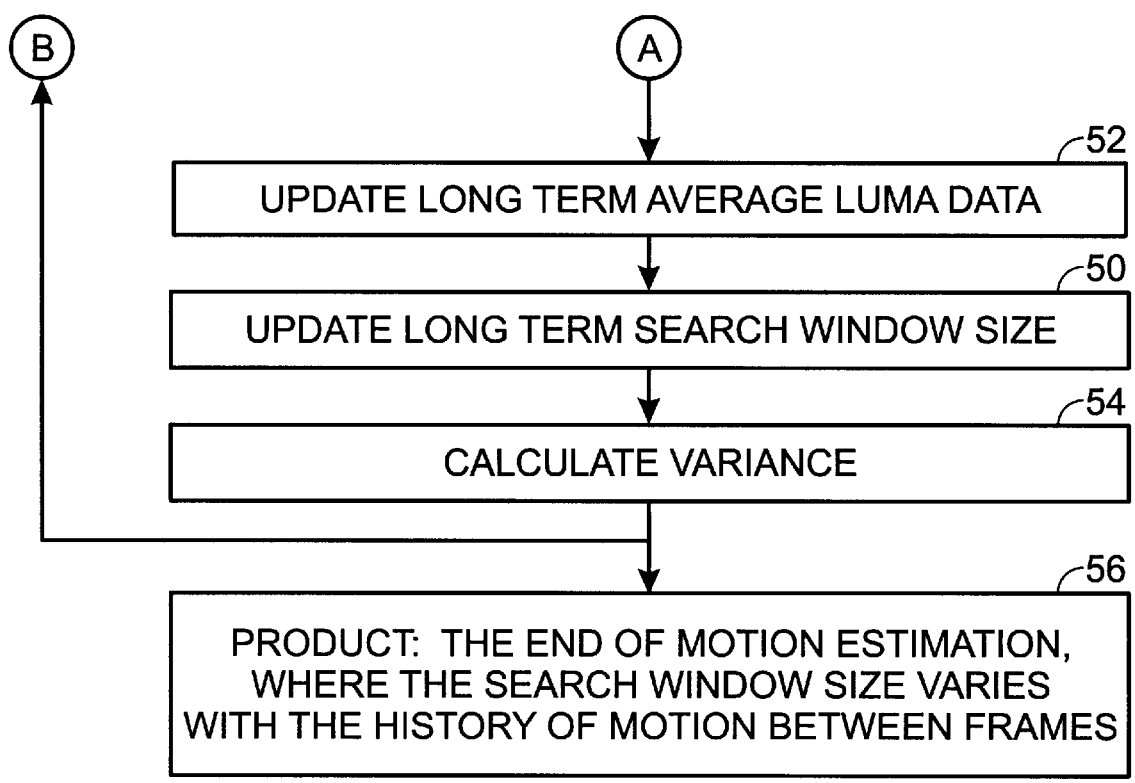

FIG. 6 is a more detailed depiction of the flow chart of FIG. 5. Steps 10, 12, 14, and 16 are essentially the same in both FIGS. 5 and 6, and will not be repeated here. Referring to FIG. 6, Step 38 calculates a search window size, centered about the candidate matrix selected in Step 14, in response to a short term average comparison of luma pixel data provided in Step 16. Step 38 includes defining the search window size in terms of the number of iterations (ME_step) of Steps 40–42 required until the spacing between block-sized matrices is the minimum spacing. Alternately stated, the initial spacing (s) between potential candidate matrices is calculated in response to ME_step calculated in Step 38.

Step 40 compares the luma pixel data from a plurality of block-sized matrices of luma pixels uniformly distributed inside the search window, to the lima pixel data of first block in the current frame. Typically, the blocks of luma pixels are macroblocks each containing a 16×16 matrix of luma pixels. In this manner, a new candidate matrix having luma pixel data most similar to the luma pixel data of the first block in the current frame is selected. By using a average to aid in the calculation of the search pattern, the size of the search window varies with the history of motion between frames. Step 40 initially distributes the plurality of block-sized matrices compared in the search window in response to the value of ME_step. After the initial distribution in the first iteration of Step 40, every following iteration of Step 40 reduces the size of the search window by half.

A minimum spacing between block-sized matrices in the search window is provided. Computations are kept simple by making the minimum spacing 1 pixel, or the distance between neighboring pixels. However, the present method is applicable to any spacing, or sub-spacing between pixel locations.

Step 42, following Step 40, reduces the spacing between the plurality of block-sized matrices located inside the search window after each iteration of Step 40. In this manner, the search field becomes more narrowly focused in an area of the previous frame with each iteration of search for a new candidate matrix.

Decision block 44 iterates the search as follows:

when the spacing between the plurality of block-sized matrices is greater than, or equal to the minimum spacing, then the process returns to Step 40; and when the spacing between the plurality of block-sized matrices is less than the minimum spacing, then the process continues to Step 46.

Step 46 compares luma pixel data of the final candidate matrix selected in the final iteration of Step 40 to the luma pixel data of the first block in the current frame, to calculate a final comparison of luma pixel data, whereby the difference in block position between the final candidate matrix and the first block provides a vector describing motion between frames. At this step in the process the change position estimate for the first block is complete, however, the process continues by preparing statistics necessary to estimate the change in position of the next macroblock in the series of macroblocks following the first block.

In one aspect of the invention, Step 38 includes using a maximum ME_step of 5. Alternately stated, decision block 44 causes Steps 40–42 to repeat a maximum of 5 iterations in response to decisions as to whether the minimum spacing between potential candidate blocks in Step 40 has been obtained. There is nothing in the method of the present invention to prevent the value of ME_step from being more, or less than 5, and the number is altered in response to the need for accuracy as opposed to speed (reduced number of calculations). In some applications, such as TV, or movie sequences, where motion content is large and accuracy important, ME_step exceeds 5. In video conferencing and telephonic ME_step is reduced to less than 5 in some circumstances so that other information may be communicated when the motion content is small.

Step 48, following Step 46, updates the short term average comparison of luma pixel data which is provided in Step 16 of the next iteration of the AMESSAD method, when a position estimate is made for the next macroblock in the series of macroblocks following the first block of the instant estimation. The short term average calculated in Step 48 is updated with the final comparison of luma pixel data calculated in Step 46, whereby the short term average is modified in Step 48 after the instant estimation of the first block is made. The short term average calculated in Step 48 is now prepared for provision in Step 16 of the next iteration in the process, where a position change estimate is made for the macroblock in series subsequent to the first macroblock.

As mentioned above, the macroblocks are grouped into slices, with a group of slices making a frame. Typically, the macroblocks are ordered in a series in the slice so that the macroblock estimates are always made in the same order. Once each macroblock in a slice has been estimated, the process continues to the next slice. In the special circumstance at the end of the frame, the last macroblock in the last slice updates the short term average in Step 48 for use in Step 16 of the first macroblock of the first slice in the following frame. That is, the first occurring macroblock in the first slice of the current frame is estimated subsequent to the last macroblock of the last slice in the reference frame. Alternately, a user-defined macroblock in the previous frame is used in the estimation of the first block in the current frame.

Step 50, following Step 48, updates a long term average of search window sizes with the short term average comparison of luma pixel data updated in Step 48. In one aspect of the invention, an additional step, Step 16*a* (not shown), following Step 16 and preceding Step 38, provides the long term average of search window sizes. Then, Step 38 includes calculating the search window size in response to the long term average of window search size calculated in Step 50 of the previous block change estimate. That is, at the end of the estimation process for the first macroblock, the newly updated short term average is used to update the long term average of search window sizes in Step 50 for provision in Step 16*a* of the position change estimate of the next block. The short term average of pixel data and the long term average of search windows are then used in the calculation of ME_step, in Step 38 of the macroblock subsequent in series to the first macroblock. Alternately stated, the local ME_step is determined in Step 38 with respect to the local average in ME_step, and the ME_stepAve. ME_stepAve is defined outside the local decision process. It can be user defined; and it can be updated by SAD long-term behavior, as discussed below. The ME_stepAve is the effective ME_step average made over a plurality of macroblock position change estimates.

In some aspects of the invention, the long term average in motion estimation steps, ME_stepAve, as used in the determination of ME_step, is user specified. A model is developed, below, to adaptively update the ME_stepAve variable from the user predefined value.

Within a video frame, macroblocks have different extents of motion. A local motion estimation search window size is determined based upon the local SAD statistical distribution. In the long term, that is, over a few frames in a video sequence, each frame has different motion content. For a segment of frames with less motion, it is desirable to use smaller search windows for motion estimation to reduce computation. When motion content is extensive, search windows must be large enough to adequately address large changes in motion vectors.

Step 52 updates a long term average comparison of luma pixel data with the final comparison of luma pixel data calculated in Step 46, whereby the long term average is updated with the position change estimate of the first block for use in estimating the next macroblock. In some aspects of the invention Step 50 includes updating the long term average search window size in response to the long term average of luma pixel data. Step 52 is shown following Step 48 and preceding Step 50 in FIG. 6 because the results of Step 52 are used in the calculation occurring in Step 50.

There are a variety of means for comparing the luma pixel data between frames. Some of these methods include the minimum mean square error measure and the sum of quantized DCT coefficients in the frequency domain. The sum of absolute differences (SAD) method has been found to be both a computationally simple and effective means of comparison. In the preferred embodiment of the invention, Step 38 includes comparing luma pixel data by the calculation of the sum of absolute differences (SAD) of luma pixel data between each of the plurality of block-sized matrices in the search window and the first block in the current frame. The block-sized matrix with the smallest SAD is selected as the candidate matrix in the next iteration of Steps 40–42. Further, Step 46 includes a calculation of the block-sized matrix with the minimum SAD (SAD_min) as the final comparison of luma pixel data.

Some aspects of the invention include a further step, following Step 14, and preceding Step 16, of Step 14*a* (not shown). Step 14*a* calculates the SAD between the initial candidate matrix selected in Step 14 and the first block in the current frame, to derive SAD_init. Then, Step 38 includes calculating the search window size in response to SAD_init calculated in Step 14*a*.

At the beginning of motion estimation for each macroblock, an initial center motion search point is selected, in Step 14, to start the motion estimation. This initial point, (xi, yi), is predicted from surrounding macroblocks in the same frame (intra prediction) or from the motion estimation results for the last reference frame (inter prediction). The SAD for the initial motion search point is SAD_init (Step 14a). ME_step (STEP 38) is selected with respect to ME_stepAve (Step 52 of the previous block estimate), by comparing SAD_init with SAD_ave (Step 48 of the previous block estimate), and with SAD_var (introduced below as Step 54 of the previous block estimate) as a scaling factor. The ME_step is assigned following a Gaussian distribution model for SAD_init, with smaller SAD_init resulting in a smaller ME_step.

Note that SAD_init (Step 14a) is the SAD calculated for the first macroblock at the very beginning of motion estimation (ME) for the macroblock; while SAD_min is the SAD at the end of ME (Step 46). They are generally different in value. SAD_init is the SAD value calculated for the center starting point of ME step search. SAD_min is the minimum for all the search points. SAD_init is used to determine ME search step. SAD_min is used to update ME statistical parameters.

Step 48 includes a short term average of SAD (SAD_ave) as the short term average comparison of luma pixel data, so that Step 48 includes updating SAD_ave with the SAD_min calculated in Step 46. In this manner, the SAD_ave is updated with SAD values after the position change for the first block is estimated. Step 48 also includes calculating SAD_ave in response to the number of blocks in a frame. Specifically, Step 48 includes the calculation of SAD_ave as follows:

$$(SAD\_ave) = ((numMB-1)(SAD\_ave)_0 + SAD\_min)/numMB$$

where $(SAD\_ave)_0$ is the SAD_ave from the previous macroblock position change estimate, and numMB is the number of macroblocks in a frame.

Step 52 includes a long term average (SAD_aveLT) as the long term average comparison of luma pixel data. That is, Step 52 includes updating SAD_aveLT with SAD_min calculated in Step 46, whereby SAD_aveLT is updated with SAD values after the position change of the first block is estimated. Step 52 also includes calculating SAD_aveLT in response to the total number of blocks in a plurality of frames. Specifically, Step 52 includes the calculation of SAD_aveLT as follows:

$$(SAD\_aveLT) = ((numMBsLT-1)(SAD\_aveLT)_0 + SAD\_min)/numMBsLT$$

where $(SAD\_aveLT)_0$ is the SAD_aveLT calculated from the previous macroblock position change estimate, and numMBsLT is the total number of macroblocks in a user-defined plurality of frames.

The long-term statistics window length numMBsLT is larger than numMB and it usually covers a few frames, for instance, three frames. SAD_aveLT is initialized to zero with SAD_ave and updated at the completion of motion estimation for each macroblock.

Figure 1:
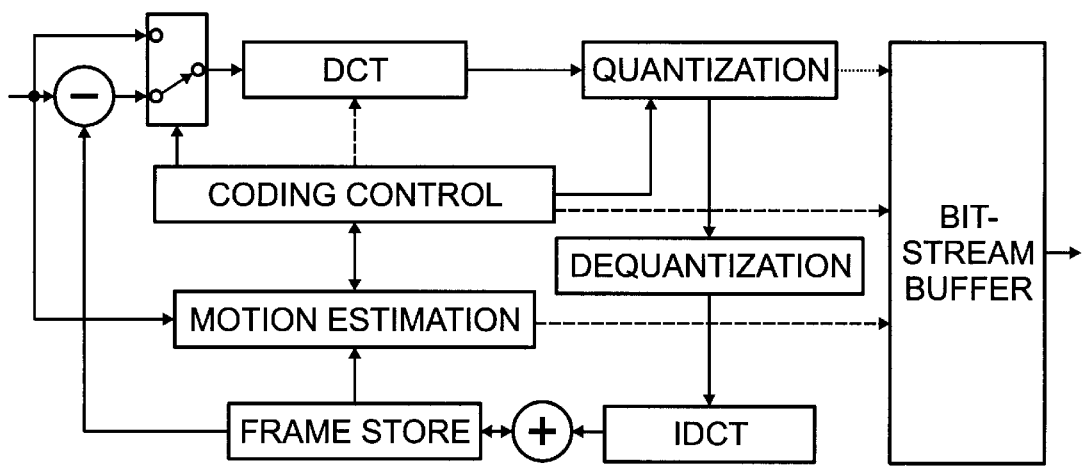
FIG. 1 is a block diagram for a video encoding scheme (prior art).
Figure 2:
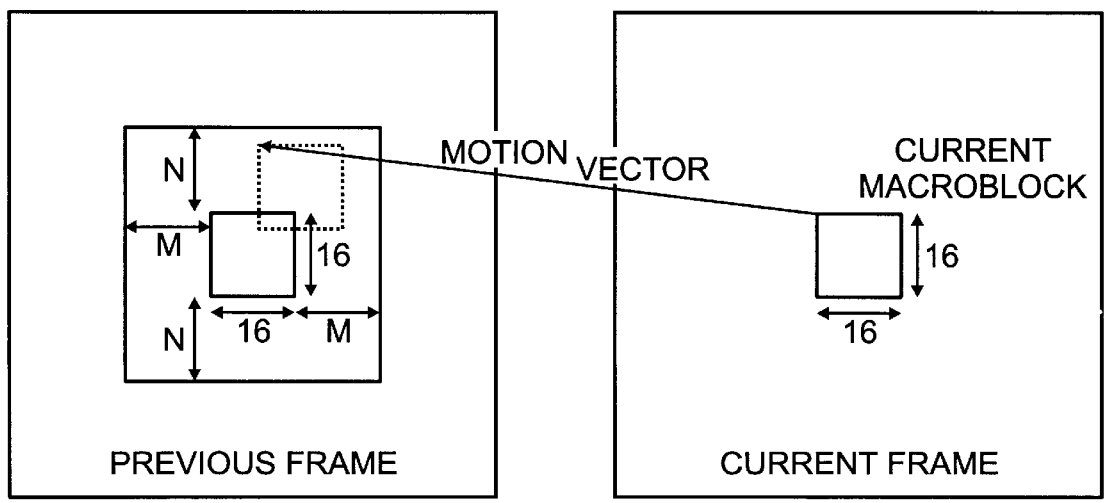
FIG. 2 is a drawing illustrating the spatial relationship between the current macroblock in the current frame and search window in the previous frame (prior art).
Figure 3:
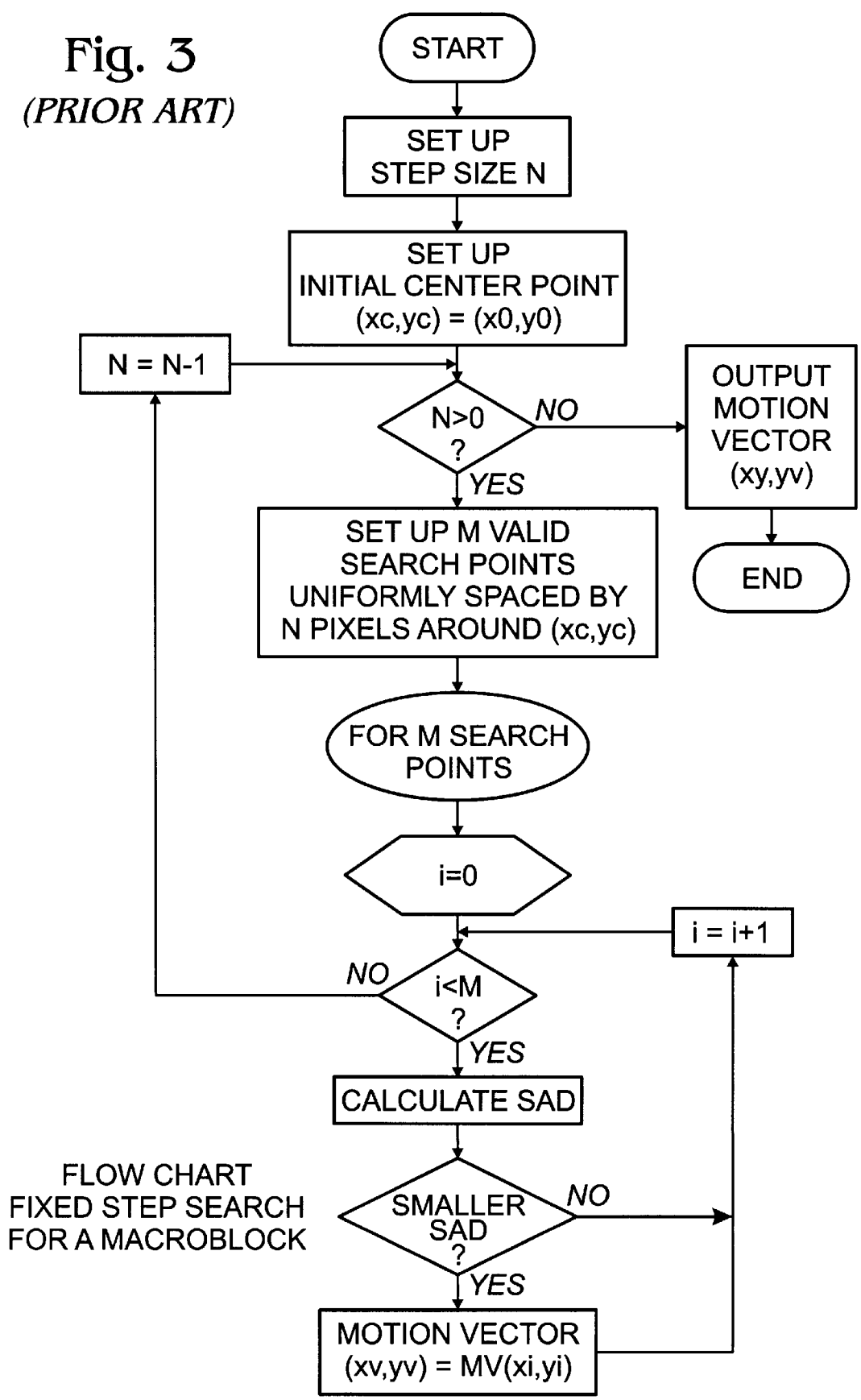
FIG. 3 is a flow chart illustrating the fixed-step motion estimation method (prior art).
Figure 4:
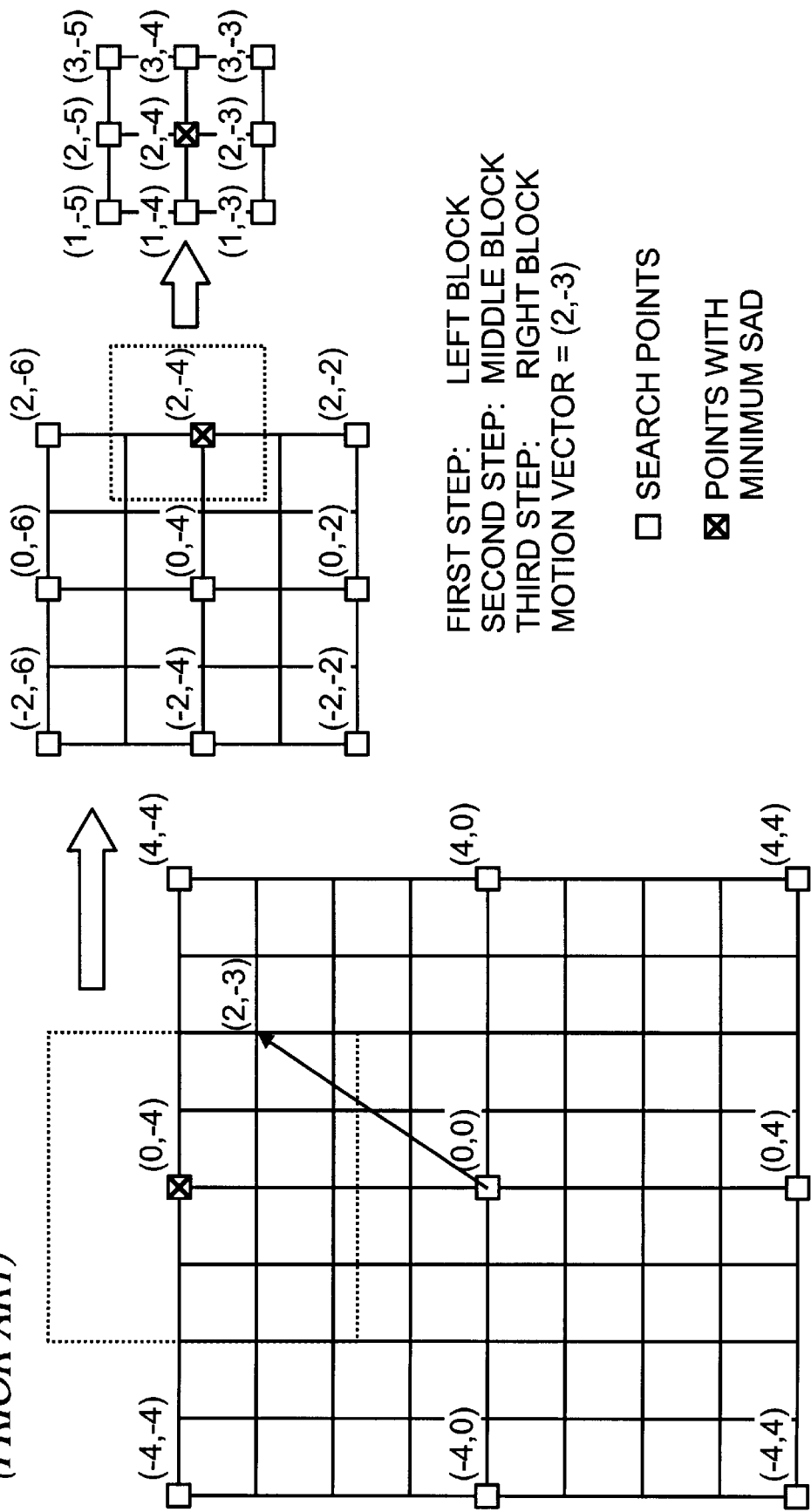
FIG. 4 is an example illustrating the last 3 steps in the step-search method of FIG. 3 (prior art).

Typically, Step 40 includes comparing luma pixel data, or SAD between the macroblock selected in Step 12 and at least 8 block-sized matrices in the search window, uniformly separated by a whole number of pixel spacings. Although the method of the present invention is applicable to a variety of search window shapes and candidate matrix shapes, a square search window size, as is well known for use with the standard fixed-step method of search, has been found to be effective. As described above and shown in FIG. 4, in the fixed-step method, 8 potential candidate matrices are placed along the sides of the search window, with 1 matrix in each corner. A ninth matrix is positioned in the center. Since the candidate matrix with the lowest SAD value is used as the center matrix in the next search iteration, it is unnecessary calculate the SAD value for the center matrix in the next iteration of Step 40. In special circumstances the search window is positioned so that some potential candidate matrices are positioned out of the frame, or off the "screen". In these situations it is unnecessary to calculate the SAD values for the candidate macroblocks outside the frame.

In some aspects of the invention Step 54, following Step 48, calculates a variance in SAD (SAD_var) in response to SAD_min calculated in Step 46, SAD_ave updated in Step 48, and the number of macroblocks in a frame. SAD_var is an updated value that is derived from previous macroblock position change estimates. Specifically, Step 54 includes the calculation of SAD_var as follows:

$$SAD\_var = sqrt[((numMB-1)*((SAD\_var)_0)^2 + (SAD\_min-SAD\_ave)^2)/numMB]$$

where $(SAD\_var)_0$ is the SAD_var from the previous macroblock position change estimate, and "sqrt" is an expression for "the square root of."

In some aspects of the invention, a further step, following Step 16, and preceding Step 38, Step 16b (not shown) is included. Step 16b provides SAD_var. As with the other statistics of Steps 48, 50, and 52, the SAD_var value updated in Step 54 is provided in Step 16b and used in Step 38 of the next iteration of the AMESSAD method to estimate the position change of the next macroblock following the first block. Step 38 includes the calculation of ME_step in response to the SAD_var, calculated in Step 54 of the previous block estimate, and provided in Step 16b. Specifically, Step 38 includes the calculation of ME_step as follows:

if SAD_init<SAD_ave−SAD_var, then
   ME_step=ME_stepAVE−2;
else if SAD_init<SAD_ave, then
   ME_step=ME_stepAVE−1;
else if SAD_init<SAD_ave+SAD_var, then
   ME_step=ME_stepAVE;
else if SAD_init<SAD_ave+2(SAD_var), then
   ME_step=ME_stepAVE+1; and
else ME_step=ME_stepAVE+2.

Following Step 54, the method of the present inventions returns to Step 12 for the selection of the next macroblock in the series of macroblocks for a position change estimate, or the method proceeds to Step 56, the end of motion estimation process, where the size of the search window varies with the history of motion between frames. When the method proceeds to Step 12, the statistical parameters updated in Steps 48, 50, and 52 effectively represent SAD statistics over a sliding window of length of numMB in terms of the most recently processed macroblocks.

In Step 50, ME_stepAve is determined for the local window of length numMB by comparing SAD_ave, which represents statistical SAD behavior of recent numMB macroblocks, with the long-term trend represented with SAD_aveLT over numMBsLT macroblocks. A valid ME_stepAve is assigned with thresholding the difference in SAD_ave and SAD_aveLT. If SAD_ave is smaller than SAD_aveLT by a certain extent, it means that the local frame has less overall motion, and therefore the step average ME_stepAve is reduced, as vice versa.

In some aspects of the invention, ME_stepAve is initialized with a value of 4, and Step 50 includes updating the calculation of ME_stepAVE as follows:

if SAD_ave>$a_0$(SAD_aveLT)/$a_1$, then
ME_stepAVE=ME_stepAVE+1; and
else if SAD_ave<$a_2$(SAD'_aveLT)/$a_1$, then
ME_stepAVE=ME_stepAVE−1
where $a_0$>$a_1$>$a_2$>0.

The values of $a_0$, $a_1$, $a_2$ vary according the specific circumstances in which the estimating procedure is used. One useful ordering has Step 50 include the value of $a_0$ being 10, $a_1$ being 8, and $a_2$ being 7.

In some aspects of the invention, Step 40 includes using the value of ME_step calculated in Step 38 to, in turn, calculate s. The designator s represents the number of pixels initially separating the centers (or upper-left hand corners) of adjoining macroblock-sized matrices in the search window, where s is calculated as follows:

$$s = 2^{(ME\_step-1)}$$

Then, Step 42 includes dividing the value of s by 2, to reduce the spacing between macroblocks in the search window after every iteration of Steps 40–42.

Figure 7:
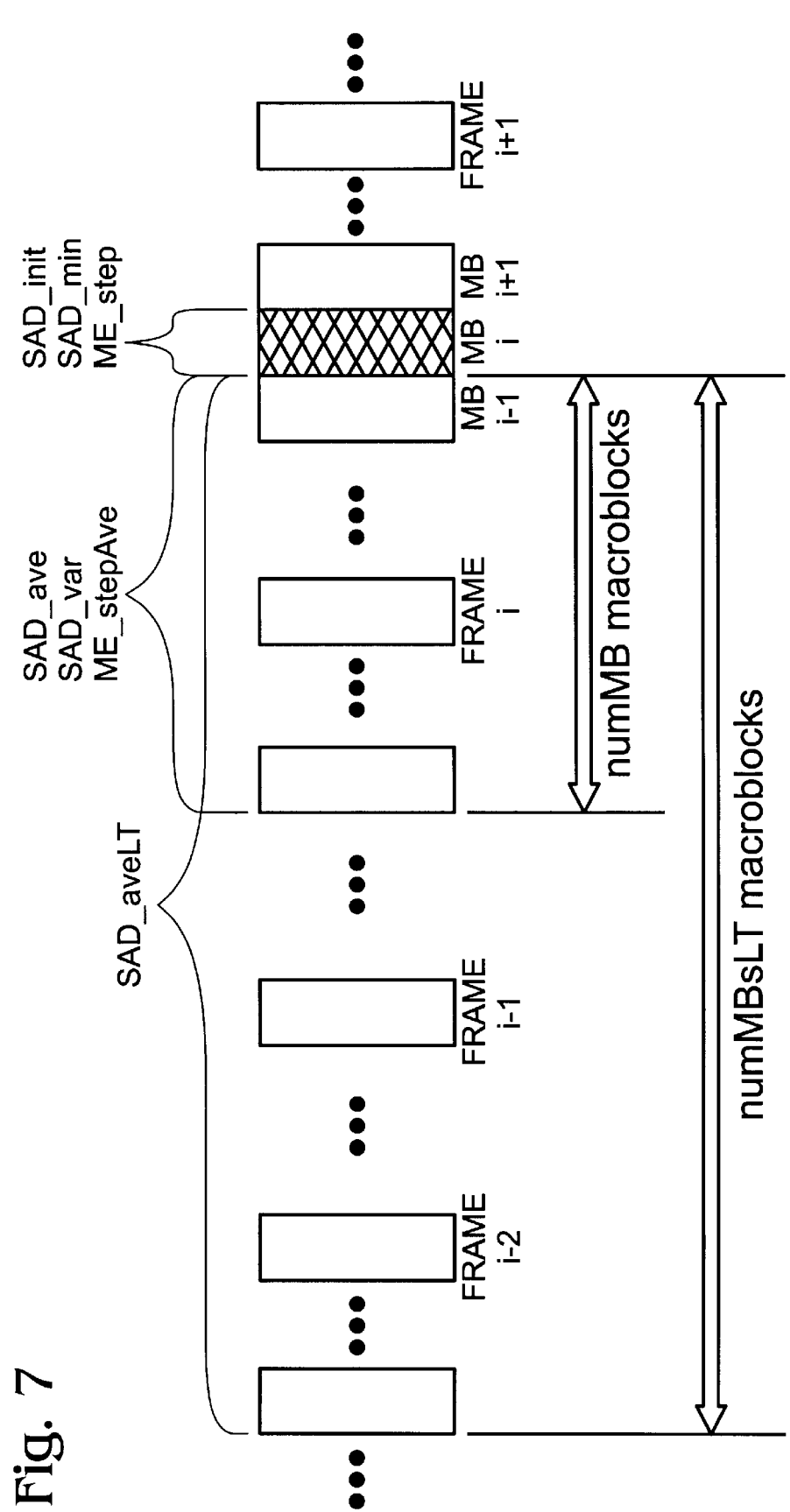
FIG. 7 illustrates the relative range of variables described in FIG. 6.

FIG. 7 illustrates the relative range of variables described in FIG. 6. SAD_init, SAD_min, and ME_step are considered entirely local values, and are only used in the current macroblock. SAD_ave, SAD_var, and ME_stepAVE are considered short term values. Depending on the application, the formulas for these variables is varied to emphasize, or de-emphasize recent updates.

Combining the local adaptation of ME_step and short term adaptation of ME_stepAve, the overall effect is that smaller step sizes are assigned to regions with less motion, and larger step sizes are used for difficult regions. In the long term, ME_stepAve varies in response to the change of SAD_ave, in comparison with SAD_aveLT. Within a range of the local frame, motion estimation steps for each macroblock are further adaptively determined by comparing the macroblock motion content with its neighbor macroblocks.

A pseudo code representation of the AMESSAD algorithm is presented below:

```
//AMESSAD algorithm pseudo code---Kai Sun @SDI Copyright (1997)
    //Initialization at the beginning of application program
    static int SAD_ave = 0, SAD_var = O, SAD_aveLT = 0;
    Setting up numMBs and numMBsLT with numMBsLT> numMBs.
    //Entering macroblock loop
    for (;;) {
    //Setting up local motion estimation step size at the
    beginning of macroblock
    //ME_stepAve update from long-term SAD trend
    ME_stepAve = 4;
    if (SAD_ave > ((10*SAD_aveLT)/8)) {
        ME_stepAve = ME_stepAve + 1;
    }
    else if (SAD_ave < ((7*SAD_aveLT)/8)) {
        ME_stepAve = ME_stepAve − 1;
    }
    //local ME_step update from SAD_init and ME_stepAve
    Set up initial center search point (xi, yi) for motion
    estimation;
    Calculate SAD_init for the point (xi, yi);
    if (SAD_init < (SAD_ave u SAD_var))
        ME_step = ME_stepAve − 2;
    else if (SAD_init < (SAD_ave))
        ME_step = ME_stepAve − 1;
    else if (SAD_init < (SAD_ave + SAD_var))
        ME_step = ME_stepAve;
    else if (SAD_init < (SAD_ave + 2* SAD_var))
        ME_step = ME_stepAve + 1;
    else
        ME_step = ME_stepAve + 2;
    //Setting up step search loop
    Set up search points space s = 2^(ME_step − 1);
    //Entering step search loop − ME_step steps
    while (s >= 1) {
        calculate 9 (or 8) search points;
        calculate and find the search point (x0, y0) with
            minimum SAD: SAD_min;
        assign motion vector corresponding to (x0, y0);
        assign new center search point to (x0, y0);
        ME_step −= 1;
        s = s/2;
    }//end of step search loop
    //Statistical update at the end of macroblock motion
        estimation
    SAD_ave = ((numMBs−1)*SAD_ave + SAD_min)/numMBs;
    SAD_var =sqrt[ ((numMBs−1)*SAD_var*SAD_var
        +(SAD_min u SAD_ave)*(SAD_min -
        SAD_ave))/numMBs];
    SAD_aveLT = ((numMBsLT−1)*SAD_aveLT +
        SAD_min)/numMBsLT;
    //Motion compensation and source coding for the macroblock
    here
}//End of macroblock loop
//End of AMESSAD algorithm pseudo code
```

Figure 8:
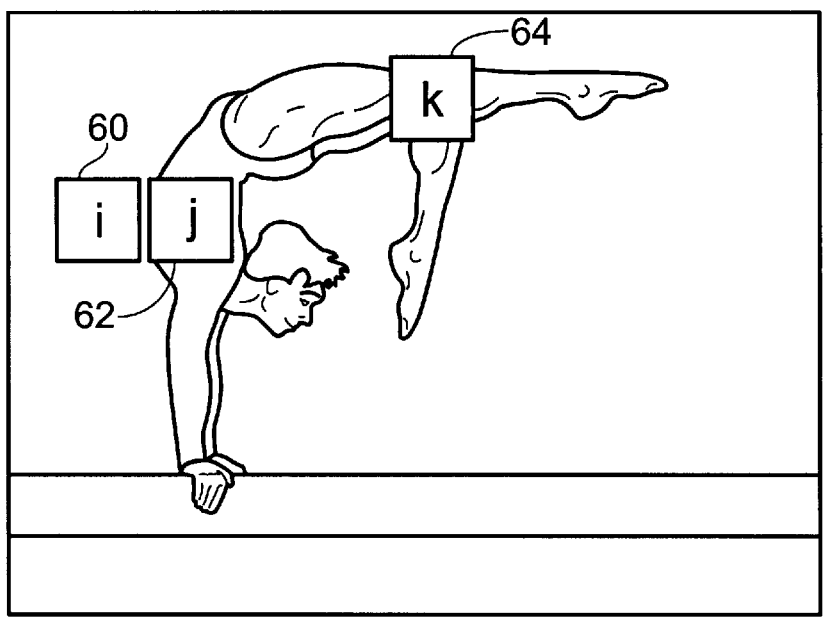
FIG. 8 is an example of a frame of a video image for comparison of the method of the present invention with the fixed-step method.

FIG. 8 is an example of a frame of a video image for comparison of the method of the present invention with the fixed-step method. Three macroblocks are labeled in the frame. Macroblock i 60 is in a region with little motion. Macroblock j 62 has more motion, while macroblock k 64 has the greatest motion present.

Figure 9:
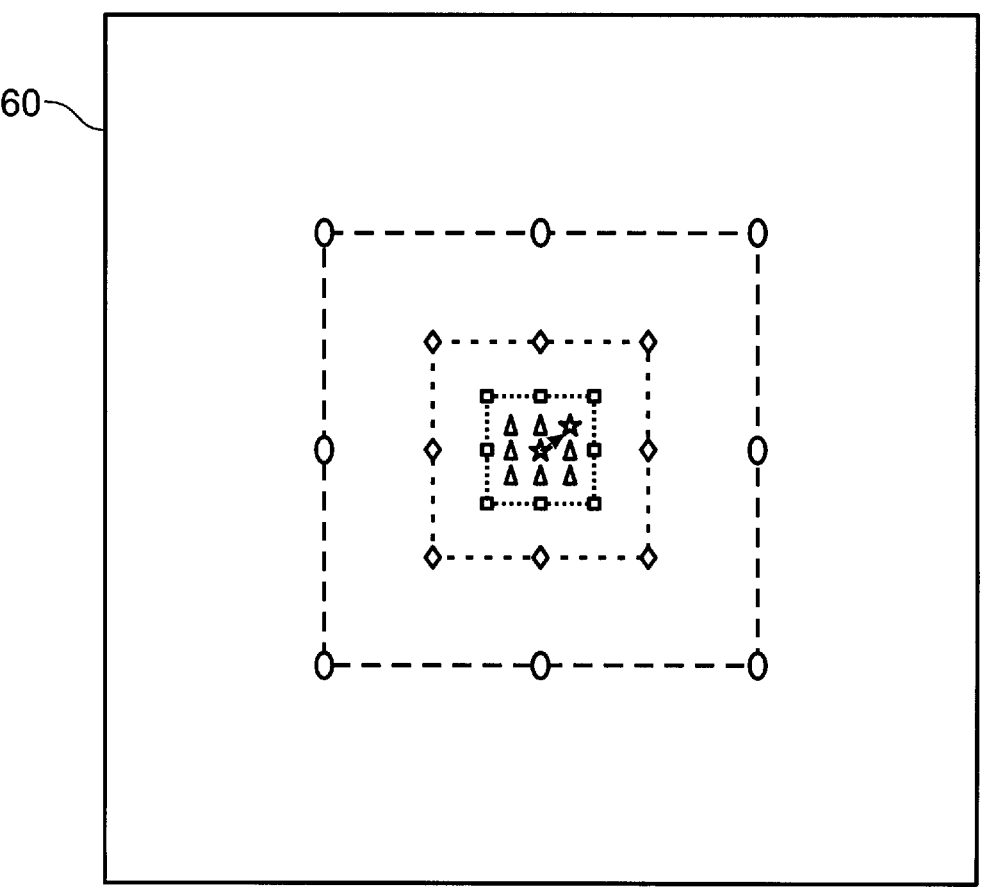
FIG. 9 illustrates the search procedure related to macroblock i of FIG. 8 using the fixed-step method (prior art).

It takes 4 steps in fixed-step search to determine that the motion vector for macroblock i 60 is (1, −1). Note, movement from a position in the right and downward directions is considered to be positive, while motion up and to the left is considered negative. FIG. 9 illustrates the search procedure related to macroblock i 60 of FIG. 8 using the fixed-step method (prior art). The center starting position is at (0, 0). The search point with the minimum SAD in each search step is labeled with a star. Because the motion for macroblock i 60 is minimal, the point with the minimum SAD in the first 3 search steps is always at the center. That is, the block-sized matrix used as the initial starting point in the search is the same as matrix finally chosen with the minimum SAD value.

Figure 10:
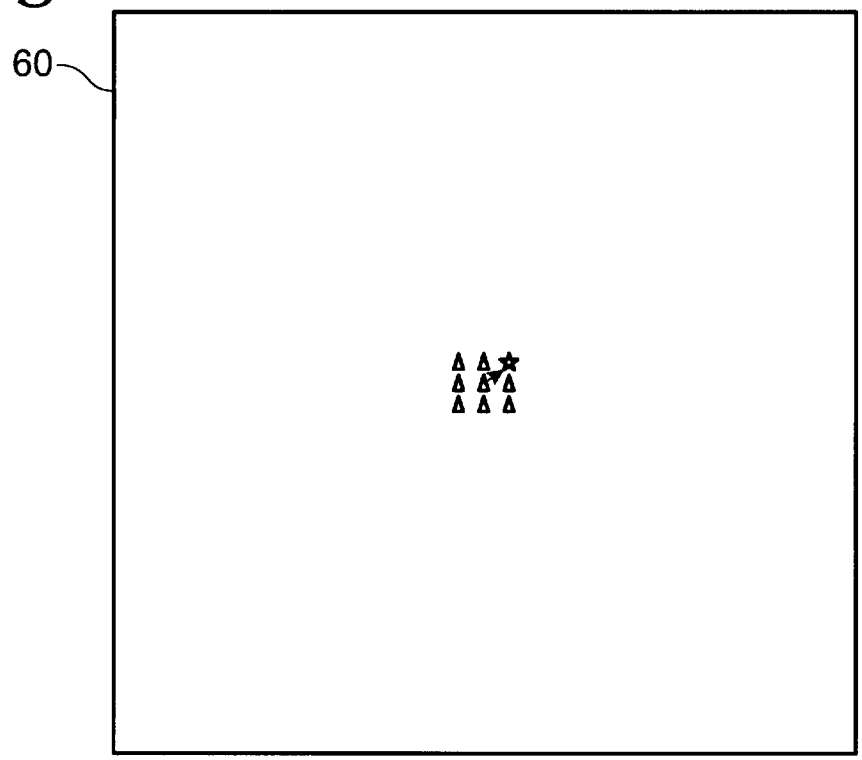
FIG. 10 illustrates a one step search for macroblock i of FIG. 8 made in accordance with the AMESSAD algorithm.

FIG. 10 illustrates a one step search made for macroblock i 60 of FIG. 8 in accordance with the AMESSAD algorithm. With AMESSAD algorithm, only one step for motion estimation is performed for this macroblock because the algorithm determines that the SAD for the macroblock is small. So much smaller than the average in SAD, that the motion vector for the macroblock is very close, if not equal, to the predicted motion vector at the beginning. Hence, a great saving in computation is achieved while still obtaining the same motion vector. In general, the motion vector obtained using the AMESSAD algorithm is close, if not equal, to the fixed-step method.

Figure 11:
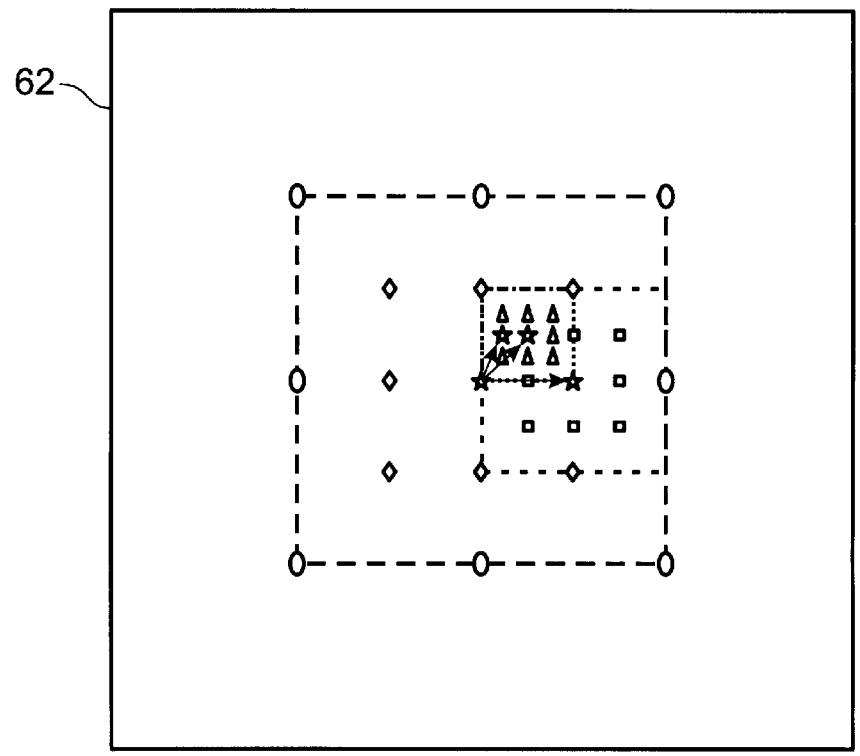
FIG. 11 illustrates the fixed-step search procedure for macroblock j of FIG. 8 (prior art).
Figure 12:
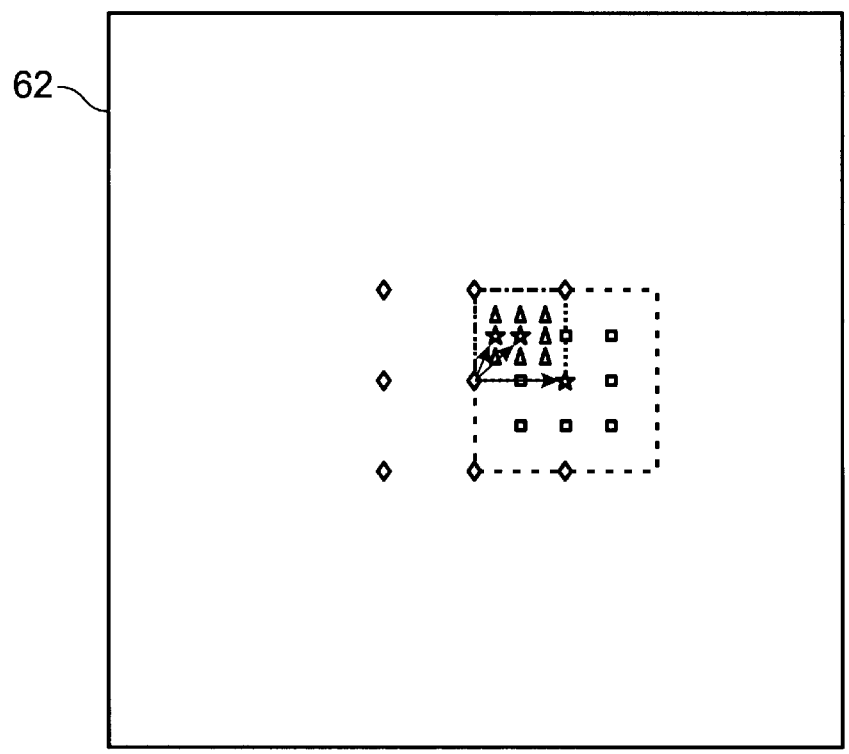
FIG. 12 shows the search path determined by the AMESSAD algorithm for the search of macroblock j of FIG. 8.

FIG. 11 illustrates the fixed-step search procedure for macroblock j 62 of FIG. 8 (prior art). For macroblock j 62, the 4-step search resulted in a motion vector of (1, −2). FIG. 12 shows the search path determined by the AMESSAD algorithm for the search of macroblock j 62 of FIG. 8. The AMESSAD algorithm for this macroblock invokes 3 steps of search, based on the statistical behavior of its SAD value (its SAD is around the SAD average). Again, this example shows the same resulting motion vector. Comparing FIGS. 11 and 12, the AMESSAD method saved a complete search iteration, or 8 cost computations.

Figure 13:
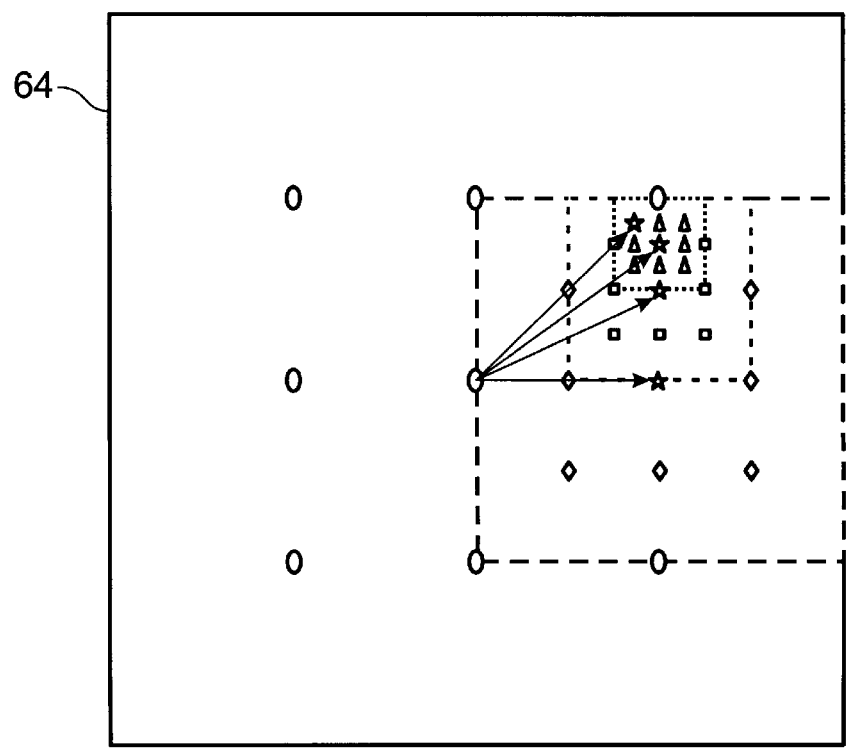
FIG. 13 illustrates the same search path determined by both the AMESSAD and fixed-step algorithms for macroblock k of FIG. 8.

FIG. 13 illustrates the same search path determined by both the AMESSAD and fixed-step algorithms for macroblock k 64 of FIG. 8. Finally, macroblock k 64 illustrates the case in which the macroblock has great amount of motion. An extensive motion vector search, with a large search range is needed to find a good match. This macroblock has a SAD value much larger than the average in SAD and the deviation is larger than the variance in SAD. The AMESSAD algorithm then results in a full step search (4 steps).

The AMESSAD model depends upon the fact that pixel data in a typical video sequence is continuous, and motion over successive frames is also smooth. Further, regions with large motion vectors associate with large change in motion vectors. The novel AMESSAD algorithm provides improvement over the fixed-step search algorithm by adaptively allocating computation effort according to local motion statistical behavior. As a result, the algorithm reduces overall motion estimation computation efforts while preserving motion vector accuracy. Extensive experimental results show motion estimation speed increases of up to 35%.

The algorithm provides full range motion estimation search at the beginning of a sequence. This ensures the timely convergence of estimated motion vectors to real ones. The AMESSAD motion search algorithm is platform independent, making it easily adopted to both hardware and software implementations. In addition, the algorithm effectively differentiates regions across frames and within a frame in a sequence with activity, therefore, focusing more efforts in regions with heavy motion. As a result, objects with rich motion content are coded with more accurate motion vectors. These objects generally correspond to foreground and are of greater interest. Objects with less motion contents, which generally represent less-interesting picture background, are coded with less accurate motion vectors than that in fixed-step search. Visually important objects in a video sequence are coded for higher quality. Hence, better visual quality is observed in many cases.

The AMESSAD method is explained, above, with regard to the selection of a macroblock in the current frame, and a search in the reference frame for a corresponding macroblock. The method is also applicable to a reversed search process where a macroblock is chosen in the reference frame, and a search conducted in the current frame for a corresponding macroblock-sized matrix. The method is also applicable to the use of chroma data pixels, or combinations of luma and chroma pixels. Other variations and embodiments of the AMESSAD method will occur to those skilled in the art.

What is claimed is:

1. In a digital video system compression format where a video sequence is represented in series of frames, including a previous frame followed by a current frame, all separated by a predetermined time interval, the frames being divided into a plurality of blocks with predetermined positions, with each block having a size to include a predetermined matrix of luma pixels, a method for efficiently estimating the change in position of an image represented by a matrix of luma pixel data in a series of blocks in the current frame, from corresponding block-sized matrices of luma pixel data in the previous frame, the method comprising the steps of:

a) selecting a first block in the current frame;

b) selecting a block-sized matrix of luma pixels in the previous frame as an initial candidate matrix corresponding to the first block in the current frame;

c) providing a short term average comparison of luma pixel data between frames, derived from previous block position change estimates;

d) calculating a search window size, centered about the candidate matrix, in response to the short term average comparison of luma pixel data provided in Step c);

e) where a minimum spacing between block-sized matrices in the search window is provided, comparing the luma pixel data from a plurality of block-sized matrices of luma pixels uniformly distributed inside the search window, to the luma pixel data of first block in the current frame to select a new candidate matrix having luma pixel data most similar to the luma pixel data of the first block in the current frame, whereby the size of the search window varies with the history of motion between frames;

f) reducing the spacing between the plurality of block-sized matrices located inside the search window after each iteration of Step e);

g) iterating the search as follows:
   1) when the spacing between the plurality of block-sized matrices is greater than, or equal to the minimum spacing, then return to step e); and
   2) when the spacing between the plurality of block-sized matrices is less than the minimum spacing, then continue; and h) comparing luma pixel data of the final candidate matrix selected in the final iteration of Step e) to the luma pixel data of the first block in the current frame, to calculate a final comparison of luma pixel data, whereby the difference in block position between the final candidate matrix and the first block provides a vector describing motion between frames.

2. A method as in claim 1 including the further step, following Step h), of:

i) updating the short term average comparison of luma pixel data, with the final comparison of luma pixel data calculated in Step h), whereby the short term average is modified for provision in Step c) of the next position change estimate.

3. A method as in claim 2 including a further step, following Step i), of:

j) updating a long term average of search window sizes with the short term average comparison of luma pixel data updated in Step i);

$c_1$) a step following Step c), and proceeding Step d), of providing the long term average of search window sizes; and in which Step d) includes calculating the search window size in response to the long term average of window search size, whereby the long term average is updated in Step j) for provision in Step $c_1$) of the next block position change estimate.

4. A method as in claim 3 including the further step, following Step j), of:

k) updating a long term average comparison of luma pixel data with the final comparison of luma pixel data calculated in Step h), whereby the long term average is updated with the position change estimate of the first block; and in which Step j) includes updating the long term average search window size in response to the long term average of luma pixel data.

5. A method as in claim 4 in which Step e) includes comparing luma pixel data by the calculation of the sum of absolute differences (SAD) of luma pixel data between each of the plurality of block-sized matrices in the search window and the first block in the current frame, in which the block-sized matrix with the smallest SAD is selected as the candidate matrix in the next iteration of Steps e)–f), and in which Step h) includes a calculation of the block-sized matrix with the minimum SAD (SAD_min) as the final comparison of luma pixel data.

6. A method as in claim 5 including a further step, following Step b), and preceding Step c), of:
- $b_1$) calculating the SAD between the initial candidate matrix selected in Step b) and the first block in the current frame, to derive SAD_init; and
- in which Step d) includes calculating the search window size in response to SAD_init calculated in Step $b_1$).

7. A method as in claim 6 in which Step k) includes a long term average (SAD_aveLT) as the long term average comparison of luma pixel data, and in which Step k) includes updating SAD_aveLT with SAD_min calculated in Step h), whereby SAD_aveLT is updated with SAD values after the position change of the first block is estimated.

8. A method as in claim 7 in which Step d) includes defining the search window size in terms of the number of iterations (ME_step) of Steps e)–f) required until the spacing between block-sized matrices is the minimum spacing, and in which Step e) includes initially distributing the plurality of block-sized matrices compared in the search window in response to the value of ME_step.

9. A method as in claim 8 in which Step i) includes a short term average of SAD (SAD_ave) as the short term average comparison of luma pixel data, and in which Step i) includes updating SAD_ave with the SAD_min calculated in Step h), whereby the SAD_ave is updated with SAD values after the position change for the first block is estimated.

10. A method as in claim 9 in which Step i) includes calculating SAD_ave in response to the number of blocks in a frame, and in which Step k) includes calculating SAD_aveLT in response to the total number of blocks in a plurality of frames.

11. A method as in claim 10 in which Step b) includes selecting the initial candidate matrix in response to position changes previously estimated for neighboring blocks, whereby an intra prediction is used to start the estimation process for the first block.

12. A method as in claim 11 in which Step b) includes selecting the initial candidate matrix in response to a position change previously estimated for the first block in the previous frame, whereby an inter prediction is used to start the estimation process for the first block.

13. A method as in claim 11 in which Step e) includes comparing luma pixel data from at least 8 block-sized matrices in the search window, uniformly separated by a whole number of pixel spacings.

14. A method as in claim 13 wherein the blocks of luma pixels are macroblocks each containing a 16×16 matrix of luma pixels, in which Step d) includes using a maximum ME_step of 5, and in which Step g) includes a maximum of 5 iterations of Steps e)–f).

15. A method as in claim 14 including a further steps, following Step i), of:
- 1) calculating a variance in SAD (SAD_var) in response to SAD_min calculated in Step h), SAD_ave updated in Step i), and the number of macroblocks in a frame;
- $C_2$) a step following Step c), and proceeding Step d), in which SAD_var is provided; and
- in which Step d) includes the calculation of ME_step in response to the SAD_var, whereby SAD_var is updated in Step 1) for provision in Step $c_2$) of the next block position change estimate.

16. A method as in claim 15 in which Step i) includes the calculation of SAD_ave as follows:

$$(SAD\_ave) = ((numMB-1)(SAD\_ave)_0 + SAD\_min)/numMB$$

where $(SAD\_ave)_0$ is the SAD_ave from the previous macroblock position change estimate, and numMB is the number of macroblocks in a frame.

17. A method as in claim 16 in which Step k) includes the calculation of SAD_aveLT as follows:

$$(SAD\_aveLT) = ((numMBsLT-1)(SAD\_aveLT)_0 + SAD\_min)/numMBsLT$$

where $(SAD\_aveLT)_0$ is the SAD_aveLT calculated from the previous macroblock position change estimate, and numMBsLT is the total number of macroblocks in a plurality of frames.

18. A method as in claim 17 in which Step d) includes the calculation of ME_step as follows:
- a) if SAD_init<SAD_ave−SAD_var, then ME_step=ME_stepAVE−2;
- b) else if SAD_init<SAD_ave, then ME_step=ME_stepAVE−1;
- c) else if SAD_init<SAD_ave+SAD_var, then ME_step=ME_stepAVE;
- d) else if SAD_init<SAD_ave+2(SAD_var), then ME_step=ME_stepAVE+1; and
- e) else ME_step=ME_stepAVE+2.

19. A method as in claim 18 wherein ME_stepAVE is initialized with a value of 4, and in which Step j) includes updating the calculation of ME_stepAVE as follows:
- a) if SAD_ave>$a_0$(SAD_aveLT)/$a_1$, then ME_stepAVE=ME_stepAVE+1; and
- b) else if SAD_ave<$a_2$(SAD_aveLT)/$a_1$, then ME_stepAVE=ME_stepAVE−1
  where $a_0 > a_1 > a_2 > 0$.

20. A method as in claim 19 in which Step j) includes the value of $a_0$ being 10, $a_1$ being 8, and $a_2$ being 7.

21. A method as in claim 19 in which Step e) includes using the value of ME_step calculated in Step d) to calculate s, the number of pixels initially separating the centers of adjoining macroblock-sized matrices in the search window, where s is calculated as follows:

$$s = 2^{(ME\_step-1)}; \text{ and}$$

in which Step f) includes dividing the value of s by 2, to reduce the spacing between macroblocks in the search window after every iteration of Steps e)–f).

22. A method as in claim 19 in which Step l) includes the calculation of SAD_var as follows:

$$SAD\_var = \text{sqrt}[((numMB-1)*((SAD\_var)_0)^2 + (SAD\_min-SAD\_ave)^2)/numMB]$$

where $(SAD\_var)_0$ is the SAD_var from the previous macroblock position change estimate.

23. In a digital video system compression format where a video sequence is represented in series of frames, including a previous frame followed by a current frame, all separated by a predetermined time interval, the frames being divided into a plurality of blocks with predetermined positions, with each block having a size to include a predetermined matrix of luma pixels, a method for efficiently estimating the change in position of an image represented by a matrix of luma pixel data in a series of blocks in the current frame, from corresponding block-sized matrices of luma pixel data in the previous frame, the method comprising the steps of:
- a) selecting a first block in the current frame;
- b) selecting a block-sized matrix of luma pixels in the previous frame as an initial candidate matrix corresponding to the first block in the current frame;
- c) providing a short term average comparison of luma pixel data between frames, derived from previous block position change estimates;

d) with the use of the short term average provided in Step c) to define the search pattern, searching in the area of luma pixels surrounding the candidate matrix to find a final candidate block-sized matrix that most closely compares with the luma pixel data of the first block, whereby a history of position changes defines the search pattern; and e) updating the short term average comparison of luma pixel data, with the comparison of luma pixel data of the first block and the final candidate matrix calculated in Step d), whereby the short term average is modified for provision in Step c) of the next block position change estimate.

24. A method as in claim 23 including the further step, following Step d), of:

f) updating a long term average comparison of luma pixel data with the comparison of luma pixel data of the first block and the final candidate matrix calculated in Step d).

25. A method as in claim 24 including further steps of:

g) a step following Step f), updating a long term average of search pattern sizes in response to the short term average comparison of luma pixel data updated in Step e) and the long term average comparison of luma pixel data updated in Step f);

$c_1$) a step following Step c), and proceeding Step d), of providing the long term average of search pattern sizes; and in which Step d) includes defining the search pattern in response to the long term average of the search pattern size.

26. A method as in claim 25 in which Step d) includes comparing luma pixel data by the calculation of the sum of absolute differences (SAD) of luma pixel data between each of the plurality of block-sized matrices in the search window and the first block in the current frame, and in which a calculation of the block-sized matrix with the minimum SAD (SAD_min) is the comparison of luma pixel data between the first block and the final candidate matrix.

27. A method as in claim 26 in which Step c) includes a short term average of SAD (SAD_ave) as the short term average comparison of luma pixel data, and in which Step e) includes updating SAD_ave with the SAD_min calculated in Step d), whereby the SAD_ave is updated with SAD values in Step e) for provision in Step c) of the next block position change estimate.

28. A method as in claim 27 in which Step f) includes a long term average (SAD_aveLT) as the long term average comparison of luma pixel data, and in which Step f) includes updating SAD_aveLT with SAD_min calculated in Step d), whereby SAD_aveLT is updated with SAD values in Step f) for provision in Step g.

29. A method as in claim 28 in which Step e) includes updating SAD_ave in response to the number of blocks in a frame, and in which Step f) includes updating SAD_aveLT in response to the total number of blocks in a plurality of frames.

30. A method as in claim 29 in which Step b) includes selecting the initial candidate matrix in response to position changes previously estimated for neighboring blocks, whereby an intra prediction is used to start the estimation process for the first block.

31. A method as in claim 29 in which Step b) includes selecting the initial candidate matrix in response to position changes previously estimated for the first block in the previous frame, whereby an inter prediction is used to start the estimation process for the first block.

32. A method as in claim 29 including further steps, following Step e), of:

h) calculating a variance in SAD (SAD_var) in response to SAD_min calculated in Step d), SAD_ave updated in Step e), and a the number of macroblocks in a frame;

$c_2$) a step following Step c), and proceeding Step d), in which SAD_var is provided; and in which Step d) includes defining the search pattern in response to the SAD_var.

33. In a digital video system compression format where a video sequence is represented in series of frames, including a previous frame followed by a current frame, all separated by a predetermined time interval, the frames being divided into a plurality of macroblocks with predetermined positions, with each macroblock having a size to include a 16×16 matrix of luma pixels, a method for efficiently estimating the change in position of an image represented by a matrix of luma pixel data in a series of macroblocks in the current frame, from corresponding macroblock-sized matrices of luma pixel data in the previous frame, the method comprising the steps of:

a) selecting the next macroblock in the series of macroblocks in the current frame;

b) selecting a macroblock-sized matrix of luma pixels in the previous frame as an initial candidate matrix corresponding to the macroblock selected in Step a), in response to position changes previously estimated for neighboring blocks, whereby an intra prediction is used to start the estimation process;

c) calculating the SAD (SAD_init) between the macroblock selected in Step a) and the initial candidate matrix selected in Step b);

d) providing a short term average SAD (SAD_ave) of luma pixel data between frames, derived from previous position change estimates;

e) providing a long term average of ME_step (ME_stepAVE), made in a plurality of macroblock position change estimates;

f) providing a variance in SAD (SAD_var) derived from previous position change estimates;

g) calculating the number of iterations (ME_step) of searching required until the spacing between block-sized matrices is the minimum spacing, the ME_step calculation being responsive to the values of SAD_init, SAD_ave, ME_step AVE, and SAD_var;

h) calculating the initial spacing (s) between potential candidate matrices in response to the value of ME_step calculated in Step g);

i) calculating the SAD between the macroblock selected in Step a) and at least 8 uniformly distributed macroblock-sized matrices, with a spacing between the centers of neighboring matrices equal to s, to locate a new candidate matrix with the minimum SAD (SAD_min);

j) iterating the search process as follows:
1) when s is greater than, or equal to the minimum spacing, then divide s by 2, creating a new value of s, and go to Step i); and
2) when s is less than the minimum spacing, then continue;

k) selecting the final candidate matrix in the final iteration of Step i) and comparing to the block selected in Step a) to calculate SAD_min;

l) with the SAD_min, updating SAD_ave, ME_stepAVE, and SAD_var for use in calculating ME_step in Step g) of the position change estimate of the next macroblock; and m) going to Step a) and repeating the position change estimate process for the next macroblock in the series subsequent to the macroblock selected in Step a), whereby the number of search iterations required for a position change estimate varies in response to the history of SAD of previously estimated macroblocks.

* * * * *